United States Patent Office 3,687,764
Patented Aug. 29, 1972

3,687,764
METHOD FOR PRODUCING A MULTILAYER REINFORCED PLASTIC SHEET MATERIAL
John E. Rogosch, Baton Rouge, La., and Floyd B. Williams, Middletown, Ohio, assignors to Ethyl Corporation, New York, N.Y.
Application Sept. 27, 1967, Ser. No. 670,916, now Patent No. 3,616,130, which is a continuation-in-part of application Ser. No. 634,560, Apr. 28, 1967. Divided and this application Sept. 23, 1970, Ser. No. 74,923
Int. Cl. B32b 7/10
U.S. Cl. 156—179                                                   5 Claims

ABSTRACT OF THE DISCLOSURE

A flexible, reinforced laminated plastic sheet material made from two sheets of a multilayer thermoplastic material having a web of reinforcing strands received therebetween. The two sheets of material are bonded to each other in the interstices provided in the web. The contacting side of each sheet of material in composed of a layer of a thermoplastic having a lower melting point or sealing temperature than the outer layer of the multilayer thermoplastic material. The inner layers are bonded to each other without the use of any adhesive by passing the two sheets and the enclosed web between rotating heated laminating rolls.

---

This application is a division of application Ser. No. 670,916, filed Sept. 27, 1967, now U.S. Pat. 3,616,130, which application is a continuation-in-part of application Ser. No. 634,560, filed Apr. 28, 1967, now abandoned.

BACKGROUND OF THE INVENTION

Field of the invention

This invention relates to a flexible, reinforced plastic sheet material and to a method for forming the material. More particularly the invention relates to a laminated plastic sheet material made from two sheets of a multilayer thermoplastic material having a web of strands received between the two plastic sheets.

Description of the prior art

Sheets of flexible, reinforced laminated plastic material are finding increasing use in a wide variety of applications today. The advent of low cost thermoplastic material, e.g., polyethylene has increased the use of reinforced polyethylene as a covering for greenhouses, barns, temporary buildings, weatherproofing large buildings under construction, as a covering material for materials stored in the open, e.g., lumber, grain, hay, and many other uses. Most reinforced thermoplastic sheet material is manufactured by laminating a web of strand material between two sheets of thermoplastic. Reinforced film is commonly made by heat bonding thermoplastic film through the openings provided in the web of reinforcing material, by applying adhesive to the web or to one or more of the innerfaces of the thermoplastic material and pressing the plastic material to either side of the reinforcing material, and by extruding one or more layers of thermoplastic material onto a reinforcing material to provide a unitary reinforced thermoplastic sheet. Among patents disclosing reinforced thermoplastic material and methods for their manufacture are U.S. Pats. 2,851,389; 3,214,320; and 3,222,237.

The reinforcing material may be in the form of a prewoven scrim or woven mesh material having wide openings between the strands. The strands from which the web is prepared may be from either monofilament or multifilament materials. In some cases it is preferred to lay a uniformly arranged array of strands of reinforcing material into a web on one of the plastic sheets immediately prior to applying adhesive thereto or fusing the sheets together by heat. Machines for laying down a nonwoven scrim to provide reinforcement between sheets of plastic material are shown in U.S. Pats. 3,272,679; 3,156,027; and 1,914,801.

SUMMARY OF THE INVENTION

It is an object of this invention to provide a reinforced laminated plastic sheet material having high bond strength between the laminated plastic sheets.

It is a further object of this invention to provide a reinforced laminated plastic sheet material which does not require the use of separately applied adhesive materials.

It is also an object of this invention to provide a reinforced laminated plastic sheet material which can be fabricated without subjecting the plastic laminae to heat damage.

It is a still further object of this invention to provide a reinforced laminated plastic sheet material which can be bonded by applying heat at a temperature below that normally used to heat laminate conventional thermoplastic.

It is another object of this invention to provide an economical process for manufacturing a reinforced laminated plastic sheet material.

The foregoing objects are realized in a flexible reinforced laminated plastic sheet material having a first laminate of a preformed unitary plastic sheet material having at least one outer layer of a first flexible thermoplastic composition and an inner layer of a second flexible thermoplastic composition having a melting point or sealing temperautre substantially below the first composition. A web composed of uniformly arranged strands is applied to the inner layer of the first laminae of plastic sheet material. A second laminae having the same structure as the first laminae has its inner layer applied to the web and bonded to the first laminae in the interstices provided in the web.

By utilizing two sheets of thermoplastic material wherein each sheet is composed of at least two layers of thermoplastic material, one having a lower sealing temperature than the other, it is possible to fabricate the laminated plastic sheet material by the application of relatively low pressures and low temperatures thereby avoiding damage to the heat sensitive thermoplastic sheeting. Additional advantages are provided in that the use of multilayer thermoplastic film avoids the necessity of applying liquid or semi-liquid adhesives to the web or to the sheet material. It also avoids use of a molten polymer to form one or more of the sheets of plastic material used to form the laminate. Further advantages are found in the laminate of the present invention in that extremely high bond strengths are achieved by the use of relatively low temperature and pressure.

DESCRIPTION OF THE PREFERRED EMBODIMENTS

Figure 1:
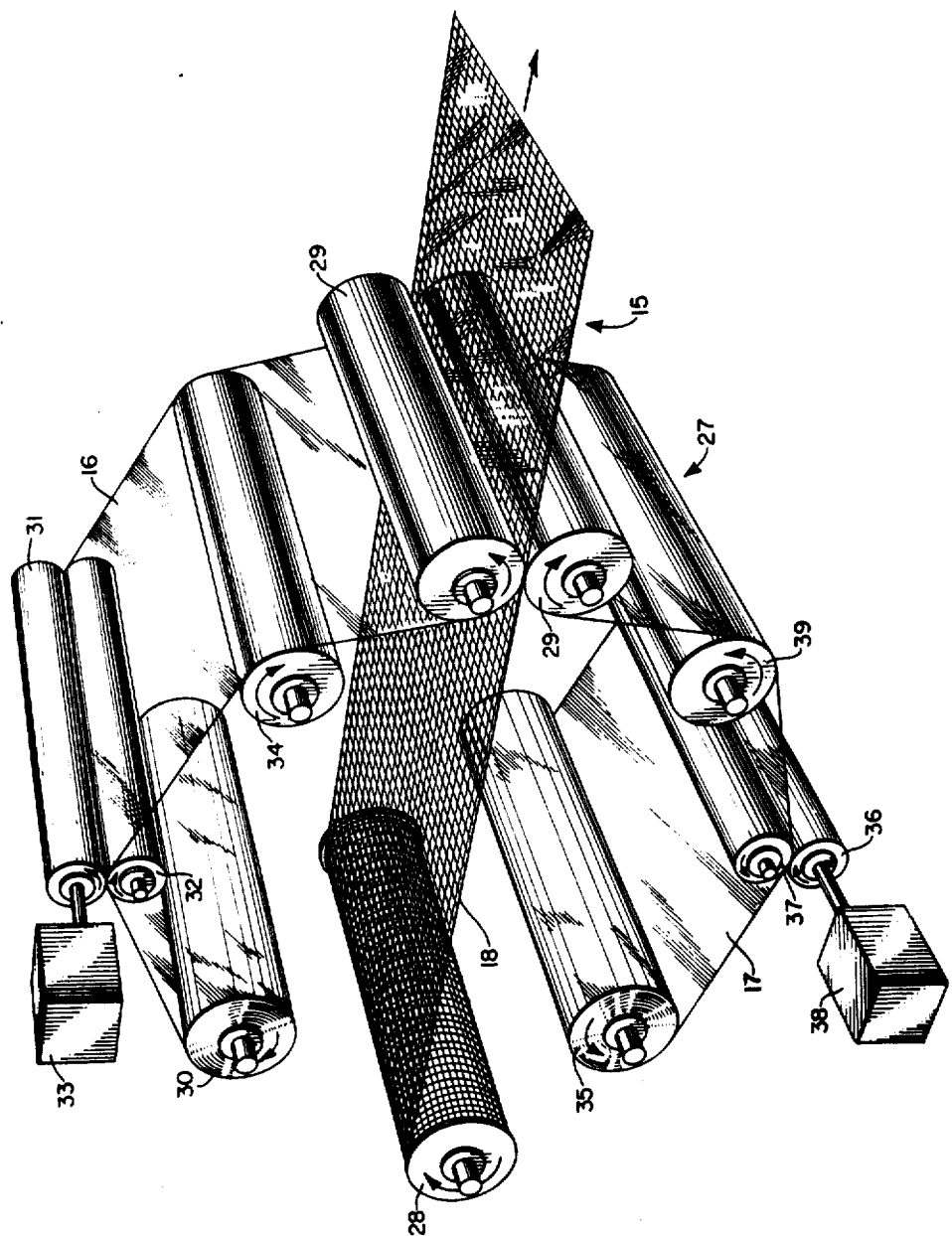
FIG. 1 is a schematic elevational perspective view of one type of apparatus that may be utilized in forming the reinforced laminate plastic material of the present invention.
Figure 2:
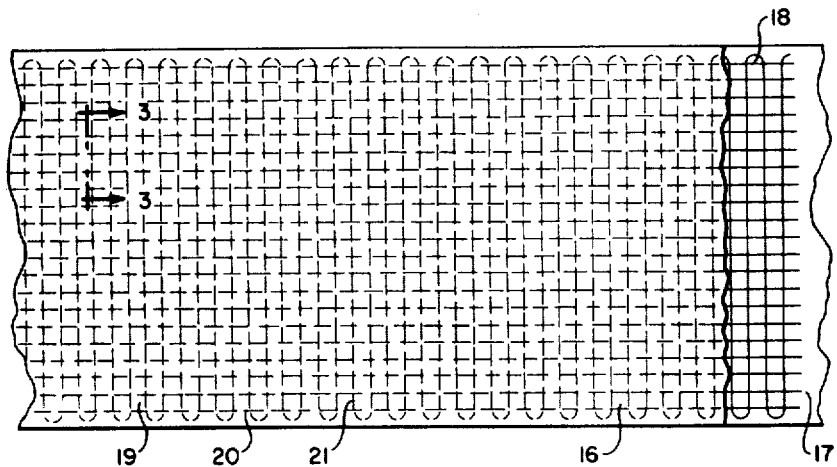
FIG. 2 is a plan view, with sections broken away, of a reinforced laminated plastic material prepared according to the present invention.
Figure 3:
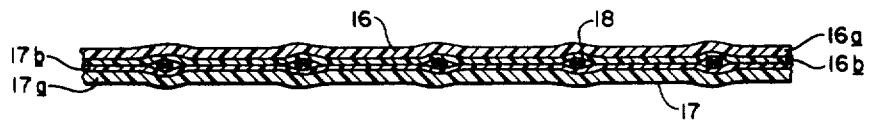
FIG. 3 is an enlarged cross sectional view of FIG. 2 along the lines 3—3.
Figure 4:
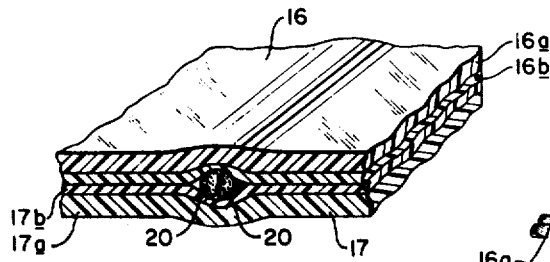
FIG. 4 is a further enlarged perspective broken view of a section of the laminate shown in FIG. 3.
Figure 5:
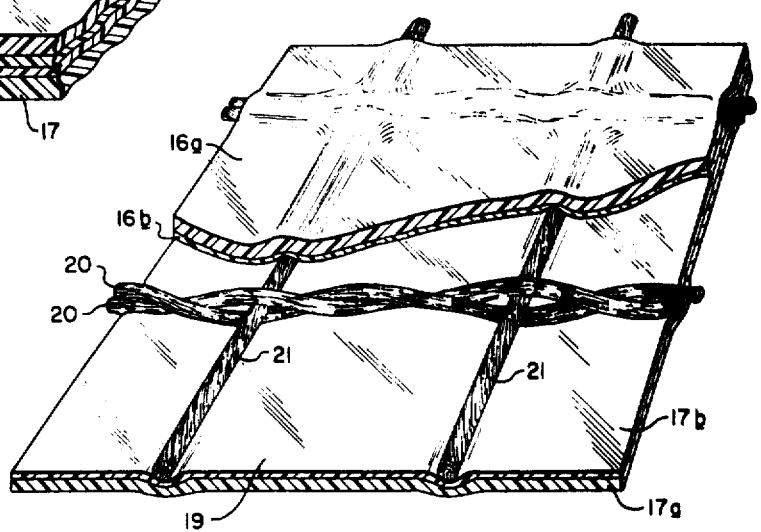
FIG. 5 is an enlarged perspective view of a portion of the laminate of FIG. 3 rotated 90 degrees, with portions broken away.
Figure 8:
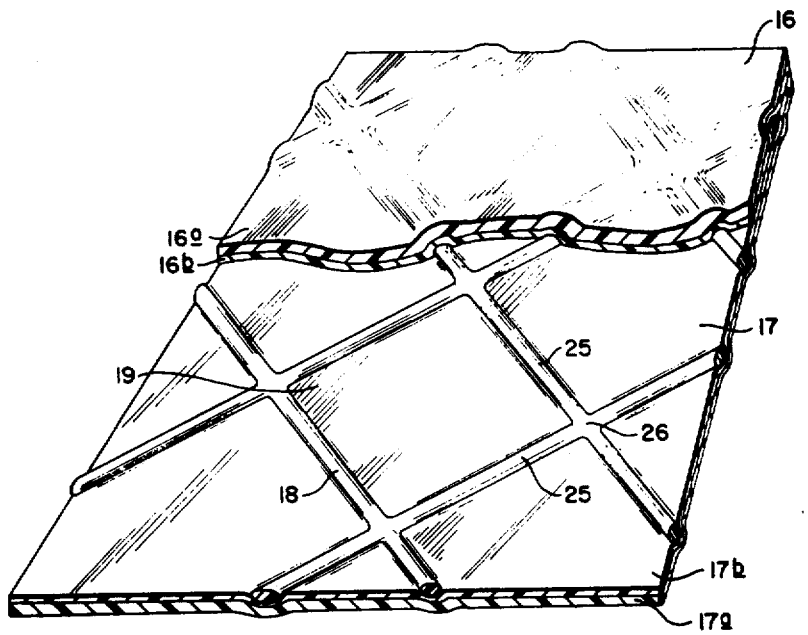
FIG. 8 is an elevational perspective view of still another embodiment of the laminate of the present invention, with portions broken away.
Figure 9:
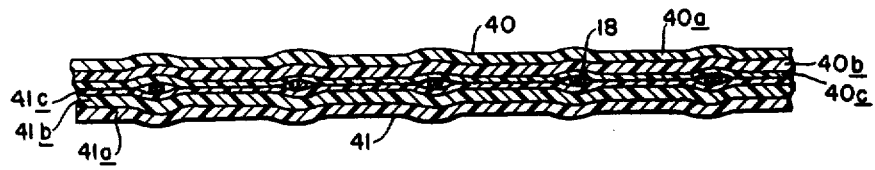
FIG. 9 is a view similar to FIG. 3 wherein the laminate is made up of sheets of plastic material each having three layers.
Figure 10:
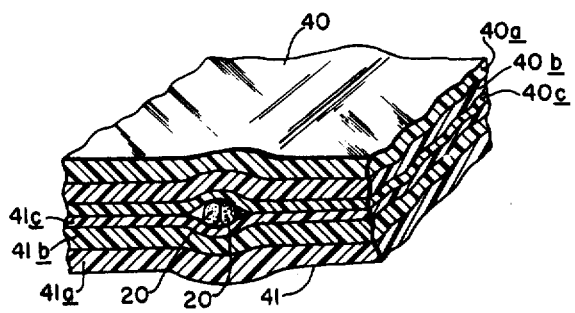
FIG. 10 is a further enlarged perspective broken view of a section of the laminate shown in FIG. 9.
Figure 11:
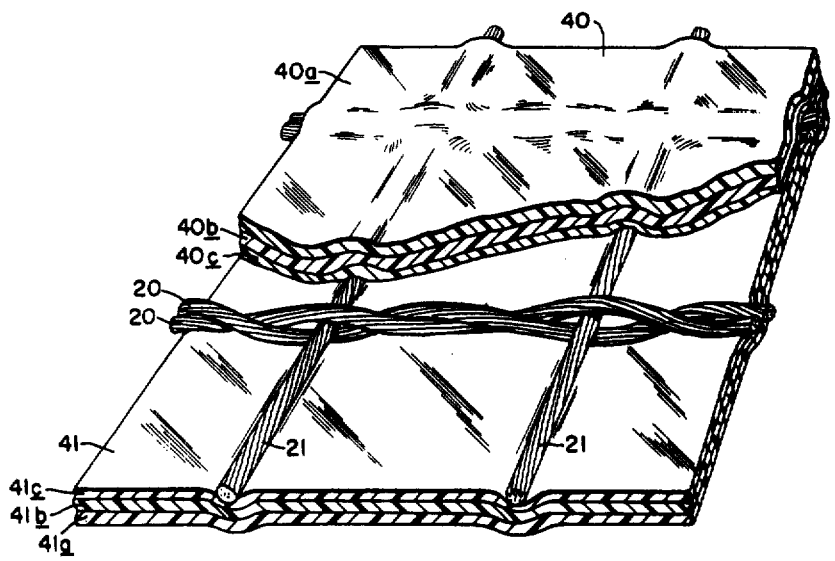
FIG. 11 is an enlarged perspective view of a portion of the laminate of FIG. 9 rotated 90 degrees, with portions broken away.

Referring to FIG. 1 the reinforced laminated plastic sheet material is designated generally by the numeral 15. The laminate is formed from an upper sheet or laminae of plastic material 16 and a lower sheet or laminae of plastic material 17. These sheets are bonded together with a reinforcing network of uniformly arranged strands of reinforcing material 18 received between the two sheets of plastic material. As seen in FIGS. 2, 3, and 4, the reinforcing web 18 provides rectangular interstices, or open spaces 19 between adjacent strands 20 of material. The plastic sheet material utilized to form the laminate is shown in FIGS. 3–8 as having two discrete layers of different thermoplastic material strongly bonded together. However it is understood that each plastic sheet may have any number of layers made of different thermoplastic material, e.g. three layers as shown in FIGS. 9–11. As seen in FIGS. 3 and 4 the upper plastic sheet or laminae 16 is composed of an outer layer of a first thermoplastic material 16a and an inner layer of a second or different thermoplastic material 16b. The lower sheet or laminae of plastic material 17 is likewise composed of two discrete layers of different thermoplastic material, the outer layer being designated 17a and the inner layer 17b. The thermoplastic sheet utilized in forming the reinforced laminate is preferably one commonly referred to as a "duplex" film. The film can be conveniently made by coaxially extruding two different thermoplastic materials from a single annular extruder die to form the film by the blown tube method. A method and apparatus for extruding multilayer film is disclosed in U.S. Pat. 3,223,761, the disclosure of which is hereby incorporated by reference. Films prepared according to the process and apparatus of the foregoing patent have two or more discrete layers which are so strongly bonded together that the layers cannot be peeled apart.

The multi-layer film used in fabricating the embodiment of the laminate of the present invention shown in FIGS. 9–11 has an inner layer of thermoplastic material 16b and 17b that is made from a thermoplastic material which has a lower melting point or sealing temperature than does the thermoplastic material used for the outer layer 16a or 17a. One of the preferred films for manufacturing the laminate of the present invention is a duplex sheet wherein the outer layer thermoplastic material is low density polyethylene and the inner layer of thermoplastic material comprises a copolymer of ethylene and vinyl acetate. It is important that the thermoplastic material used for the inner wall or layer have a melting point or a sealing temperature which is at least 5° F. below the melting point or sealing temperature of the thermoplastic material from which the other layer or layers of the thermoplastic sheet material is made. It is preferred to have an inner layer of a thermoplastic material which has a sealing temperature about 30° F. lower than that of the other layer or layers of thermoplastic material. A particularly advantageous combination in a dual wall film which provides the difference in softening point is low density polyethylene as the outer layer and ethylene-vinyl acetate copolymer as the inner layer. The low density polyethylene used for the outer layer may have a melting point of from about 140° F. to about 225° F. and the ethylene-vinyl acetate copolymer will have a melting point of from about 110° F. to about 170° F. The melting point of the ethylene-vinyl acetate copolymer varies substantially with the vinyl acetate content of the copolymer. Ethylene-vinyl acetate copolymers found particularly suitable for use in the present invention are those containing from about 1 percent by weight vinyl acetate up to about 30 percent vinyl acetate in the copolymer. Preferably the copolymer contains from about 10 to 25 percent vinyl acetate. A more particularly preferred vinyl acetate content is from about 15 to 20 weight percent. Inner layers made from 15 to 20 percent vinyl acetate copolymer exhibit very good adhesive properties when modest pressures and relatively low laminating temperatures are used. One particular low density polyethylene which has been found eminently suitable for making the outer layer of the thermoplastic sheet material used in preparing the laminate of the present invention is DFDU–4400 to which is added about 4 percent of 0836 low density polyethylene resin. The melt temperature of the DFDU–4400 resin is approximately 235° F. and the melt temperature of the 0836 resin is approximately 235° F. Each of the foregoing resins are manufactured by Union Carbide Corporation. The ethylene-vinyl acetate copolymer especially preferred for use in the inner layer is the ethylene-vinyl acetate copolymer designated DQDG–1868, manufactured by Union Carbide Corporation. This copolymer contains 18–20 percent weight vinyl acetate in the copolymer.

Another group of copolymers which are eminently suitable for preparing the inner layer of the multilayer film utilized in the laminate of the present invention are copolymers of ethylene with acrylic acid, methacrylic acid, esters of acrylic acid, and esters of methacrylic acid. Examples of suitable acrylic esters for polymerization with ethylene are allyl acrylate, methyl acrylate, ethyl acrylate, butyl acrylate and octyl arcylate. Examples of suitable methacrylate esters are methyl methacrylate, ethyl methacrylate, n-butyl methacrylate, isobutyl methacrylate, cyclohexyl methacrylate, allyl methacrylate and lauryl methacrylate. In general the percentage of the comonomer to be copolymerized with ethylene should range from about 1 percent to up to about 30 percent. The most satisfactory films for use as the inner layer of the laminate are obtained when the ethylene content of the acrylic acid of methacrylic acid or one of their esters copolymer is from 15 to 25 percent weight. Smaller quantities of the comonomers should be used when the long chain alcohol ester are utilized as comonomers, e.g., as when using the lauryl methacrylate ester as the comonomer.

The invention is not limited to the use of ethylene-vinyl acetate or ethylene-acrylic acid or methacrylic acid or their esters thereof as the inner layer film forming material in the multilayer films used in the laminate of the present invention. Other film forming polymers and copolymers are also suitable for forming the inner layer of the multilayer film. The primary criteria to be kept in mind is that the melting point or the sealing temperature of the polymer used for the inner layer be at least five degrees below that of the polymer used to form the other film layer or layers in the multilayer film. The sealing temperature is defined as the temperature at which two pieces of the thermoplastic will bond together under moderate pressure.

While polyethylene has been described as a preferred material for forming the outer layer of a duplex thermoplastic sheet material that may be used for making the laminate, the invention is not limited to the use of this polymeric material. Any thermoplastic material which can be extruded in conjunction with a lower melting thermoplastic material and which has a compatibility sufficient to form a multilayer film having a high bonding efficiency is suitable for use in forming the outer layer or layers of the multilayer film. Among those plastic materials which can be used to form the outer layer or layers of the plastic sheet for preparing the laminate of the present invention are nylon, copolymers of ethylene with other comonomers, high density polyethylene, polypropylene, propylene copolymerized with other comonomers, polycarbonate, polyvinyl chloride, vinyl chloride or vinylidene chloride copolymers, polyvinylidene chloride, polyvinyl alcohol, polyesters, polystyrene, polybutyrates, and many other thermoplastic materials which can be readily extruded to make flexible film using the coaxial extrusion process described in the aforementioned patent.

The web of reinforcing material 18 may be made of woven or non-woven strands arranged in an open mesh network. The strands may be composed of a monofilament material or multifilament material. One can use natural or synthetic material to form the individual strands or threads from multifilament stock. Strands may be monofilament synthetic materials or multifilament synthetic materials such as viscose rayon, acetate rayon, polypropylene, polyvinyl chloride, polyvinylidene chloride, copolymers of vinyl chloride or vinylidene chloride, nylons, cellulose butyrate, polystyrene, polyester, polyvinyl alcohol, and other commercially available organic filament material. Naturally occurring inorganic materials may be used to form the strands, either of mono or multifilament. Examples of inorganic material which have been found suitable for forming the strands are metals, glass, and asbestos. Naturally occurring organic materials that can be spun into strands can be used to make the reinforcement material. Among those that have been found suitable are cotton, wool, hemp, and twisted paper for making the strands.

A preferred material for forming a web of reinforcing material is rayon, preferably multifilament strands. This material furnishes adequate strength and is economical. However, if increased strength is required in the reinforced material nylon multifilament strands are very satisfactory. Also high strength can be gained from the use of monofilament and multifilament glass fibers either woven or non-woven.

Twisted and untwisted multifilamentary materials are equally suitable for use in manufacturing the web of reinforcing material 18. When twisting is desired it may range from one half turn per foot to twenty turns or more per inch. The denier of the strand material can vary over a wide range, from about 200 to about 2,500 denier strands have been found suitable. As shown in laminated plastic material depicted in FIGS. 2-5 the warp or longitudinal thread of the web 18 utilize two strands 20—20 having a slight twist and being looped over the single fill or transverse strand 21 of the web 18. Each of the strands 20-21 are made of multifilament fibers, for example high tenacity rayon.

Figure 6:
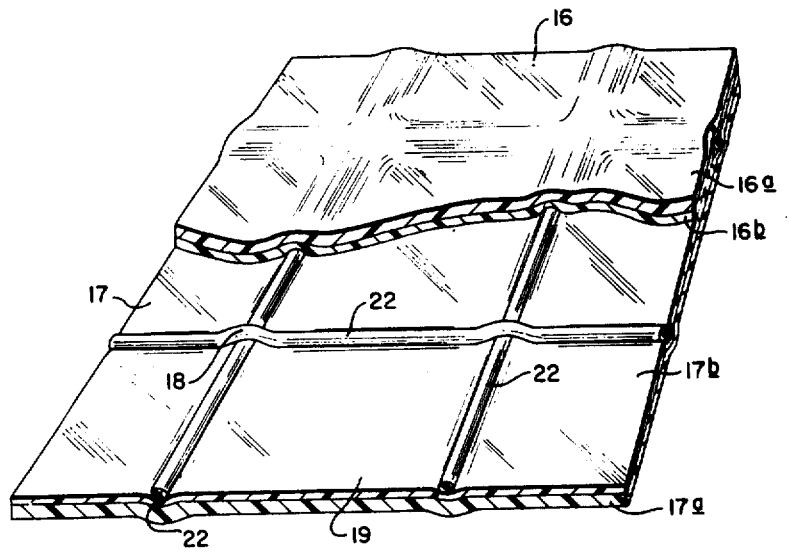
FIG. 6 is an elevational perspective view of another embodiment of the laminate of the present invention, with portions broken away.
Figure 7:
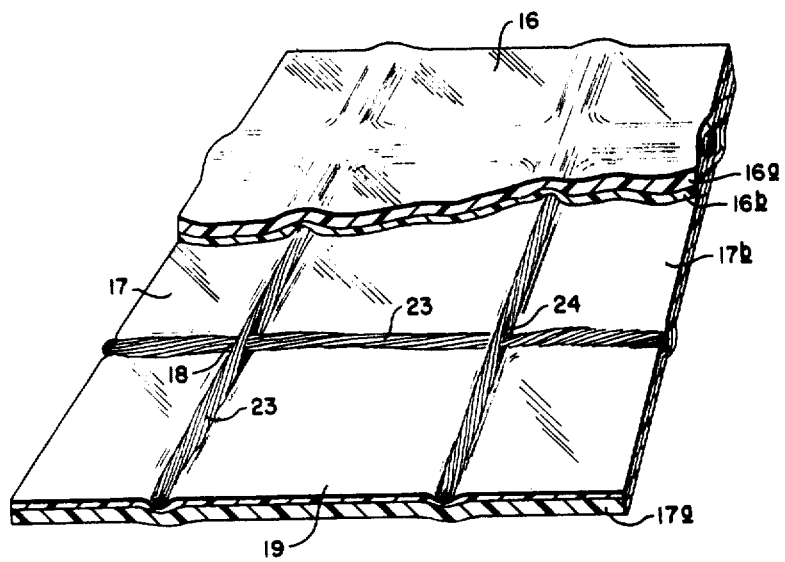
FIG. 7 is an elevational perspective view of still another embodiment of the laminate of the present invention, with portions broken away.

Referring to FIG. 6, there is shown an embodiment of the laminate of the present invention which is readily manufactured using a monofilament synthetic strand 22 for both the warp and fill strands in the laminate material. In this construction the warp and fill threads are nonwoven and may be readily formed into a regular pattern by laying the strands 22—22 in a rectangular pattern using a scrim laying apparatus such as that described in aforementioned Pats. 3,272,679; 3,156,027; or 1,914,801. The laminate depicted in FIG. 7 the reinforcing web 18 is made from a prewoven scrim utilizing multifilamentary strands 23 for both the warp and fill threads. Each fill thread is passed through the middle of the warp thread in a transverse direction, as seen at numeral 24, providing a woven scrim. As seen in FIG. 8 the filamentary web 18 may be made from an integrally formed, prewoven mesh material composed of monofilament synthetic strands 25. This type web is advantageously formed from synthetic thermoplastic materials such as nylon or polyester type materials and fabricated by extruding an integrally formed net of material. The warp and fill threads are fused together at their intersection, as shown at numeral 26.

Referring now o FIG. 1, the laminated plastic material 15 of the present invention may be made by the laminating apparatus designated generally by the numeral 27. The web of preformed reinforcing material 18 is withdrawn from a supply roll 28 of scrim type web material. The web is fed between the nip of two laminating rollers 29—29. One or both of the laminating rollers are supplied with heat in the form of electrical heaters or steam or any other suitable source of heat (not shown). The upper multi-layer sheet of the plastic material 16 is fed into the nip of the rollers 29—29 with its inner layer facing and contacting the web of reinforcing material 18. The upper sheet of material 16 is conveniently supplied to the laminator by rolls withdrawing from storage roll 30. Since the inner layer of thermoplastic material 16b on the multilayer film could become somewhat tacky under certain storage conditions and this may result in distortion of the film when unrolled at high speeds, it is advisable to provide a separate drive assembly to draw the film from the roll 30 to prevent undue elongation and distortion of the film 16. In the apparatus depicted supply rollers 31 and 32 are utilized to draw the film from the storage roll 30 and supply it to the nip of the pressure rollers 29—29. The driven upper supply roller 31 may be conveniently powered by an electrical motor or other suitable power device designated 33. The lower supply roller 32 can be optionally driven if desired. After leaving the nip of the pair of drive rolls 31–32 the upper sheet of thermoplastic material 16 may optionally be passed over an upper preheat roller 34. This roller is supplied with a source of heat and is maintained at a temperature somewhat lower than the temperature of the laminating rolls 29—29. The preheat roll increases the production rate of the laminate by preheating the inner layer of thermoplastic material 16b to soften it and cause it to adhere to the inner layer 17b of the sheet 17 without requiring the laminating rollers 29—29 to be operated at a high temperature.

The lower sheet of thermoplastic material 17 is drawn from storage roll 35 by means of a set of lower supply rollers 36–37. A drive unit 38 similar to the upper drive unit is provided to actuate the lower supply rollers 36–37.

A wide range of temperatures may be utilized to laminate the upper and lower sheet of thermoplastic material together in the interstices of the web material. When a polyethylene material is utilized for the upper and lower laminae and an ethylene-vinyl acetate copolymer is utilized for the inner layer of each sheet of thermoplastic material, it has been found that a surface temperature range of from about 150° F., to about 450° F. on either or both of the laminating rollers 29 is satisfactory. A temperature in this range will produce a good bond between the upper and lower sheets 16 and 17. It should be noted that the temperatures at which the laminating roll or rollers are operated will be dependent upon (1) the ethylene content of the thermoplastic material utilized for the inner layer of each shet of plastic material, (2) the surface speed at which the laminating rollers are operated. When ethylene-vinyl acetate copolymer is used the temperature necessary for lamination will decrease as the vinyl acetate content of the copolymer increases. It will also be appreciated that the bonding temperature will be dependent to some extent upon the pressure exerted in the nip of the laminator rolls. With increased pressure lower temperatures may be utilized to effect the bond between the sheets 16 and 17, however, the pressure which can be applied by the laminating rolls is limited to a pressure that will not cause damage by puncturing or thinning of the outer layers of thermoplastic material 16a and 17a in the areas where the warp and fill threads of the web 18 cross each other. The preferred laminating roll temperature when using low density polyethylene and an ethylene-vinyl acetate copolymer for the inner layer containing about 15 to 25 percent vinyl acetate will range from about 175° F. to about 250° F. for each of the laminating rollers 29—29, at web speeds of from about 100 to about 200 feet per minute.

The laminating rollers 29—29 may be made from steel or any other suitable heat conducting material. It is preferred that at least one of the laminating rollers be covered by a material which has a degree of resiliency which will prevent the cutting or thinning of the thermoplastic film by pressure applied to the laminate from the rollers. In one exemplary apparatus construction similar to that depicted in FIG. 1 each of the laminating rolls 29 were covered with a non-metallic material which provided some degree of resiliency. The upper roll, made of steel, was covered with a thin coat of "Teflon," and the lower roll was covered with a silicone rubber sleeve. This arrangement provided good heat transfer and yet did not cause a thinning or cutting of the upper or lower thermoplastic sheet material in the area where the warp and fill threads crossed. When utilizing the upper preheat roller 34 and lower preheat roller 39 in the aforementioned apparatus it was found that these rollers produced a good bond and a high production rate for the laminate when they were operated at about 170° F. It should be understood that the temperature of both the laminating rollers 29—29 and the preheat rollers 34-39 will have to be adjusted depending upon the particular polymeric material used for the inner layer thermoplastic material in the multilayer sheets 16 and 17 and will also be dependent upon the thickness of the thermoplastic multilayer sheets 16 and 17. Thicker sheets will necessarily require a high operating temperature for the laminating rollers and the preheat rollers.

It is realized that other laminating apparatuses may be used to conveniently carry out the process aspects of the present invention. As stated hereinbefore the web of reinforcing material 18 may be formed in place utilizing machines similar to that depicted in the patents mentioned hereinbefore. Additionally the upper and lower sheets of duplex film 16 and 17 may be formed at the location of the laminator and fed directly to the pressure rolls 29—29 while still in a semi-formative warm condition. Instead of utilizing upper and lower preheat rollers 34 and 39, one may conveniently utilize a bank or row of electrical heating lamps in the position occupied by the preheat rollers to soften the inner layer of the upper and lower sheet material 16 and 17.

In one embodiment of the present invention a laminated plastic material was made utilizing a multilayer film having two layers wherein the outer layer of thermoplastic material was formed from a mixture of two grades of low density polyethylene. The outer layer was made from 98 percent Union Carbide polyethylene designated DFDU–4400 and 2 percent of Union Carbide polyethylene designated 0836. The inner layer of thermoplastic material was an ethylene-vinyl acetate commercially available DQDG–1868 which contained 18 percent vinyl acetate. The multilayer film was formed by the coaxial extrusion method disclosed in aforementioned U.S. Pat. 3,223,761. The multilayer film produced from the foregoing thermoplastic materials contained a low density polyethylene outer layer which was approximately 1½ mils thick and had an inner layer of the ethylene-vinyl acetate copolymer which was ½ mil thick. The laminate was made by utilizing an apparatus having a pair of heated laminating rolls, one being maintained at 175° F. and the other at 200° F. Preheat was supplied to each of the sheets of thermoplastic material by means of a row of electrical heaters arranged ahead of the nip of the laminating rolls. The reinforcing web 18 was made from multifilament rayon prewoven strand material using a leno weave similar to that depicted in the web 18 shown in FIG. 5. The warp thread was composed of two separate strands of 550 denier multifilament rayon thread. The fill thread was a 1,100 denier multifilament twisted strand. The wrap threads were slightly twisted and also had one turn looped in between each of the fill threads. The spacing between the warp and fill threads provides an opening roughly ¼ inch square. An excellent bond was achieved at the innerface of inner layers of ethylene-vinyl acetate portion of the film used to make the laminate. With this particular construction and temperature used for lamination very little direct adhesion is obtained between the inner ply of ethylene-vinyl acetate thermoplastic and the woven scrim 18. If it is desired to provide direct adhesion of the filaments or strands of the web to the upper and lower sheets of laminate material this may conveniently be accomplished by using a higher tack (lower melting point) thermoplastic for the inner layer of sheets 16 and 17. However, even without adhesion of the threads directly to the inner and outer layers excellent strength is obtained by virtue of the high bond obtained between the contacting interface of the inner layers 16b and 17b. The laminate manufactured according to the foregoing procedure was compared in tests with other laminates using different web materials also manufactured in accordance with the present invention. An additional sample of commercially available reinforced laminate made from polyethylene and a prewoven scrim by heat fusing the single layers of polyethylene layers together was obtained and tested for comparison. The results of the test appear below.

| Test sample | Laminate film | Reinforcing web | | | Intermediate yield strength, p.s.i. | Failure yield strength p.s.i. |
| | | Manufacturer | Material | Weave | Denier | | |
| --- | --- | --- | --- | --- | --- | --- | --- |
| 1 | "A" | | Nylon | Layed | 400 | 32 | 53 |
| 2 | "A" | | Cotton | do | | | 35 |
| 3 | "A" | X | Rayon | Leno | {2-550 warp / 1-1100 fill} | 50 | 65 |
| 4 | "A" | Y | do | do | {2-550 warp / 1-1100 fill} | 37 | 43 |
| 5 | "B" | Y | do | do | {2-550 warp / 1-1100 fill} | 14 | 34 |

"A"—Multilayer film 1½ mil. low density polyethylene outer layer and ½ mil. ethylene-vinyl acetate inner layer.
"B"—Commercial prior art laminate made using two sheets of low density polyethylene each 2.0 mil. thick bonded by heat between openings in reinforcing web.

The above tests were conducted on six inch square swatches of laminate. Each of the samples, except sample 5, were prepared by heating for 5 to 10 seconds at a pressure of 100–150 pounds at 250° F. the web and the thermoplastic materials between one unyielding plant and one resilient surface. The tear test reported above was an arbitrary test made on an Instron tensile tester. One corner of each of the six inch square swatches of laminated material was gripped by the upper jaws of the tester and a wire hook with ⅛ inch radius turn was inserted into each sample of laminate at a point 4 inches above the lower corner. The hook was attached to the lower jaws of the tester. The Instron jaws were moved apart at a rate of 2.0 inches per minute. The samples were tested at ambient temperature, i.e., about 76° F. The intermediate yield strength reported above is the p.s.i. gauge reading on the Instron tester at which the first tear began to form in the laminated material. The failure yield strength in p.s.i. reported above is the gauge reading on the Instron tester when the hook pulled out or through the laminated material.

It will be seen from the above that the laminated material of the present invention is substantially stronger than that made utilizing prior art methods, i.e., heat laminating two sheets of thermoplastic material together over a reinforcing scrim. The peel strengths of the laminate of the present invention are so high that they cannot be measured, i.e., the laminated film tears before it will peel between the bonded layers. By utilizing a multilayer film to form the reinforced plastic materials of the present invention, degradation of the thermoplastic outer layers of the laminate are prevented. One is able to utilize much lower temperatures for bonding the sheets of thermoplastic to each other when using the multilayer films to make the laminates of this invention. This is particularly important when working with films which are readily damaged by excessive heat, e.g., polyvinyl chloride sheeting.

As pointed out hereinbefore the multilayer film sheets used to fabricate the laminated reinforced material may have a plurality of different layers of thermoplastic material in each sheet. In the embodiment shown in FIGS. 9–11 the upper sheet of plastic material 40 may have an outer layer 40a of one plastic material, an intermediate layer 40b of another plastic material, and an inner layer 40c of still another plastic material. The lower sheet of plastic material 41 likewise has an outer layer 41a of one plastic material, and intermediate layer 41b of another plastic material, and an inner layer 41c of still another plastic material. The same reinforcing material 18 having warp threads 20 and fill threads 21 as described hereinbefore may be used to reinforce the two plastic sheets 40 and 41. Any combination of different plastic materials may be used to form the multiple layer films such as ethylene-vinyl acetate copolymer for the inner layer, polypropylene for the intermediate layer, and low density polyethylene for the outer layer. If desired the outer layer may be a plastic containing a color or a filler such as carbon black, titanium dioxide, or aluminum powder. Also the outer layer of each sheet of plastic may be covered by a metal foil such as aluminum when it is desired.

The foregoing disclosure and description of the invention is illustrative and explanatory thereof and, in light thereof, other modifications will be apparent to those skilled in the art. Therefore, the present invention is to be limited only by the scope of the appended claims.

What is claimed is:

1. A process for making flexible, reinforced, laminated plastic sheet material comprising:

(a) preforming two unitary, spaced apart sheets of thermoplastic material, each sheet having at least an outer layer of a first flexible, thermoplastic composition and an inner layer of a second flexible, thermoplastic composition selected from the group consisting of ethylene-vinyl acetate copolymers, copolymers of ethylene with acrylic acid, methacrylic acid, esters of acrylic acid, and esters of methacrylic acid, said second composition having a sealing temperature of about 30° F. lower than that of said first composition;

(b) interposing a web made from uncoated strands, which are spaced apart to provide interstices therebetween, between said two sheets of thermoplastic material arranged with their inner layers on either side of said web;

(c) simultaneously applying sufficient heat and pressure to opposed portions of the outer layer of each of said two sheets to fixedly position said web between said two sheets by bonding said sheets to each other in said interstices.

2. The process defined in claim 1 wherein said heat and pressure are applied to said sheets by passing said sheets between the nip of a pair of heated laminating rollers.

3. The process defined in claim 1 wherein each of said sheets is initially at ambient temperature and is then preheated prior to passing between said laminating rollers.

4. The process defined in claim 1 wherein each sheet of thermoplastic material is unwound from a supply roll and fed to said laminating rollers by means of a pair of driven supply rollers.

5. The process defined in claim 2 wherein said preheating is carried out by passing each of said sheets over a preheating roller.

References Cited
UNITED STATES PATENTS

| | | | |
|---|---|---|---|
| 3,468,736 | 9/1969 | Porter | 156—309 X |
| 3,474,952 | 10/1969 | Cover, Jr. et al. | 156—309 X |
| 3,502,532 | 3/1970 | Frielingsdorf | 156—309 |
| 3,547,772 | 12/1970 | Schnebelen et al. | 156—309 X |
| 3,558,394 | 1/1971 | Marby | 156—309 X |
| 3,574,022 | 4/1971 | Lampert | 156—309 X |

CARL D. QUARFORTH, Primary Examiner

P. A. NELSON, Assistant Examiner

U.S. Cl. X.R.

156—182, 224, 278, 309, 322; 161—57

PO-1050
(5/69)

UNITED STATES PATENT OFFICE
CERTIFICATE OF CORRECTION

Patent No. 3,687,764                    Dated August 29, 1972

Inventor(s)  John E. Rogosch et al

It is certified that error appears in the above-identified patent and that said Letters Patent are hereby corrected as shown below:

Column 1, line 3, in the Heading, reads "Baton Rouge, La.", should read -- Mankato, Minn. --.  Column 1, line 20, reads "in", should read -- is --.  Column 6, line 6, reads "o", should read -- to --.  Column 6, line 62, reads "shet", should read -- sheet --.  Column 8, line 17, reads "wrap", should read -- warp --.  Column 10, in the References, British Patent 641,568 is omitted.

Signed and sealed this 30th day of January 1973.

(SEAL)
Attest:

EDWARD M. FLETCHER, JR.                 ROBERT GOTTSCHALK
Attesting Officer                        Commissioner of Patents